United States Patent
Komiya (10) Patent No.: US 10,309,477 B2
(45) Date of Patent: Jun. 4, 2019

(54) TUBULAR VIBRATION-DAMPING DEVICE HAVING BRACKET

(71) Applicant: SUMITOMO RIKO COMPANY LIMITED, Komaki-shi, Aichi (JP)

(72) Inventor: Yasuhiro Komiya, Komaki (JP)

(73) Assignee: SUMITOMO RIKO COMPANY LIMITED, Komaki-shi (JP)

( * ) Notice: Subject to any disclaimer, the term of this patent is extended or adjusted under 35 U.S.C. 154(b) by 0 days.

(21) Appl. No.: 15/480,762

(22) Filed: Apr. 6, 2017

(65) Prior Publication Data

US 2017/0211647 A1  Jul. 27, 2017

Related U.S. Application Data (63) Continuation of application No. PCT/JP2016/064973, filed on May 20, 2016.

(30) Foreign Application Priority Data

Sep. 30, 2015  (JP) ................ 2015-192795

(51) Int. Cl.
*F16F 7/00* (2006.01)
*F16F 1/38* (2006.01)
(Continued)

(52) U.S. Cl.
CPC .............. *F16F 1/38* (2013.01); *F16F 1/3814* (2013.01); *F16F 1/3863* (2013.01); *B60G 11/22* (2013.01);
(Continued)

(58) Field of Classification Search
CPC .......... F16F 1/38; F16F 1/3849; F16F 1/3835; F16F 1/3842; F16F 1/3814; F16F 1/3863; F16F 2226/045
(Continued)

(56) References Cited

U.S. PATENT DOCUMENTS

| 7,234,693 | B2 * | 6/2007 | Schnaars ............... F16F 1/3863 267/140.11 |
| 2007/0172167 | A1 * | 7/2007 | Lew ....................... B60K 17/24 384/536 |

(Continued)

FOREIGN PATENT DOCUMENTS

| CN | 203784173 U | 8/2014 | |
| DE | 102013200524 A1 * | 7/2014 | ............... B60G 7/02 |

(Continued)

OTHER PUBLICATIONS

Machine translation of DE 10 2013 200 524 (no date).*
(Continued)

*Primary Examiner* — Nicholas J Lane
(74) *Attorney, Agent, or Firm* — Oliff PLC (57) ABSTRACT

A tubular vibration-damping device having a bracket including a tubular vibration-damping device press-fitted and attached into a tubular bracket, the tubular vibration-damping device including an inner shaft member, an outer tube member made of synthetic resin and disposed on an outer peripheral side of the inner shaft member, and a main rubber elastic body connecting the inner shaft member and the outer tube member. An inside projection is integrally formed with the outer tube member so as to project radially inwardly. A gap is provided between an outer peripheral surface of the outer tube member and an inner peripheral surface of the tubular bracket at a position in a peripheral wall part of the outer tube member where the inside projection is formed.

5 Claims, 3 Drawing Sheets

(51) Int. Cl.
*B60G 11/22* (2006.01)
*B60K 5/12* (2006.01)

(52) U.S. Cl.
CPC .... *B60G 2204/128* (2013.01); *B60G 2204/41* (2013.01); *B60K 5/1208* (2013.01); *F16F 2224/025* (2013.01); *F16F 2224/0208* (2013.01); *F16F 2224/0241* (2013.01); *F16F 2226/045* (2013.01)

(58) Field of Classification Search
USPC ......... 267/141.2, 141.3, 141.4, 141.5, 141.7, 267/140.5
See application file for complete search history.

(56) References Cited

U.S. PATENT DOCUMENTS

| | | | | |
|---|---|---|---|---|
| 2010/0065998 | A1* | 3/2010 | Tomida | B60G 7/02 267/293 |
| 2015/0014906 | A1* | 1/2015 | Shinobu | F16F 1/3807 267/141.2 |
| 2017/0299011 | A1* | 10/2017 | Kojima | F16F 13/16 |

FOREIGN PATENT DOCUMENTS

| | | |
|---|---|---|
| JP | 2002-276714 A | 9/2002 |
| JP | 2009-079722 A | 4/2009 |
| JP | 2014-190509 A | 10/2014 |

OTHER PUBLICATIONS

Jun. 21, 2016 International Search Report issued in International Patent Application No. PCT/JP2016/064973.

Apr. 3, 2018 International Report on Patentability issued in International Application No. PCT/JP2016/064973.

Jun. 5, 2018 Office Action issued in Chinese Patent Application No. 201680003751.6.

Jan. 17, 2019 Office Action issued in Chinese Patent Application No. 201680003751.6.

Mar. 6, 2019 Office Action issued in Japanese Patent Application No. 2015-192795.

* cited by examiner

TUBULAR VIBRATION-DAMPING DEVICE HAVING BRACKET

INCORPORATED BY REFERENCE

The disclosure of Japanese Patent Application No. 2015-192795 filed on Sep. 30, 2015 including the specification, drawings and abstract is incorporated herein by reference in its entirety. This is a Continuation of International Application No. PCT/JP2016/064973 filed on May 20, 2016.

BACKGROUND OF THE INVENTION

1. Field of the Invention

The present invention relates to a tubular vibration-damping device having a bracket that is utilized as an automotive member mount for example.

2. Description of the Related Art

Conventionally, a tubular vibration-damping device including an inner shaft member, an outer tube member disposed on an outer peripheral side of the inner shaft member with a distance, and a main rubber elastic body connecting the inner shaft member and the outer tube member has been known.

Such a tubular vibration-damping device is utilized as a vibration-damping connector or a vibration-damping support such as an automotive engine mount, a member mount, a body mount, and a suspension bushing, in a state installed between attachment members that make up a vibration transmission system such as a power unit, a body, a member, and a suspension part.

In the tubular vibration-damping device, generally an inner shaft member is fixed to one attachment member by bolt-nut structure for example and an outer tube member is press-fitted into a mounting hole of a tubular bracket provided in the other attachment member when the device is installed between the attachment members that make up the vibration transmission system.

Incidentally, in recent years, it is considered to use an outer tube member made of synthetic resin for a tubular vibration-damping device instead of conventional member made of metal, for the advantage in reductions in weight and cost and the like.

However, since characteristics such as rigidity of synthetic resin are different from that of metal, a mere change of material was not able to meet the required characteristics such as load bearing and enduring capability.

In light of that, the present applicant previously disclosed a technique in Japanese Unexamined Patent Publication No. JP-A-2002-276714, the technique adopting an outer tube member made of synthetic resin, so as to avoid malfunction such as crack of an outer tube member which was likely to occur during press-fitting into a metal tubular bracket, thereby improving durability.

However, as a result of further consideration, the present inventor found a new problem in the structure with a particular outer tube member made of synthetic resin.

SUMMARY OF THE INVENTION

The present invention relates to a tubular vibration-damping device having a bracket wherein a tubular vibration-damping device is press-fitted and attached into a tubular bracket, the tubular vibration-damping device including an inner shaft member, an outer tube member disposed on an outer peripheral side of the inner shaft member, and a main rubber elastic body connecting the inner shaft member and the outer tube member. It is directed to solve a newly detected problem in adopting an outer tube member made of synthetic resin.

Namely, in adopting an outer tube member made of synthetic resin in a tubular vibration-damping device, the present inventor thought out an idea of integrally forming an inside projection which projects radially inwardly of the outer tube member by resin molding. He focused on that on the outer tube member made of synthetic resin in particular, the inside projection is easily integrally formed while setting a variety of figure, size, location and the like appropriately during the molding of the outer tube member. Furthermore, by forming the inside projection integrally to the outer tube member, it is possible to adjust spring characteristics and spring ratio in the various direction so as to tune the vibration-damping characteristics for example, as well as to construct a stopper mechanism in a particular vibration input direction.

However, in the case where the inside projection is formed on the outer tube member, a problem is found that since the inside projection is formed integrally to the outer tube member, the rigidity and toughness of the outer tube member are made large in spite of the member being made of synthetic resin with the rigidity smaller than metal originally, so that the tubular bracket into which the outer tube member is press-fitted is sometimes damaged.

Particularly, the outer tube member made of synthetic resin fundamentally has small rigidity and deforms easily, so as to get large rigidity locally at the partial portion where the inside projection is formed. As a result, during the outer tube member is press-fitted into the tubular bracket, distortion and stress of the tubular bracket concentrates on a particular portion. This is thought to be the reason of the damage of the tubular bracket. In addition, the distortion and stress arises on the particular portion of the tubular bracket concentratedly, meanwhile the other press-fitted portion deforms widely since the outer tube member is made of synthetic resin, thereby acting comparatively smaller distortion and stress on the tubular bracket. Therefore, if the press-fit rate of the outer tube member into the tubular bracket is decreased in order to avoid the damage of the tubular bracket, the press-fitting fixing force in the other press-fitted portion becomes insufficient.

Accordingly, in adopting the outer tube member made of synthetic resin and the integrally formed inside projection projecting radially inwardly, the new problem is found that the assurance of the press-fitting fixing force of the outer tube member into the tubular bracket and avoidance of the damage of the tubular bracket are hard to compatible. The technique disclosed in JP-A-2002-276714 for avoiding crack and the like of an outer tube member is not able to deal with the problem. A new solution is required.

The present invention has been developed in view of the above-described matters as the background. A first mode of the present invention provides a tubular vibration-damping device having a bracket comprising a tubular vibration-damping device press-fitted and attached into a tubular bracket, the tubular vibration-damping device including an inner shaft member, an outer tube member made of synthetic resin and disposed on an outer peripheral side of the inner shaft member, and a main rubber elastic body connecting the inner shaft member and the outer tube member, wherein an inside projection is integrally formed with the outer tube member so as to project radially inwardly, and a gap is provided between an outer peripheral surface of the outer tube member and an inner peripheral surface of the tubular bracket at a position in a peripheral wall part of the outer tube member where the inside projection is formed.

The tubular vibration-damping device having a bracket constructed according to the present mode is able to easily adopt the inside projection whose variety of figure, size, location and the like are set appropriately with a simple structure preventing any increase in the number of parts. With the tubular vibration-damping adopting the inside projection, it is possible to adjust spring characteristics and spring ratio in the various direction by setting and changing the effective free length and volume of the main rubber elastic body appropriately by the inside projection for example, so as to be able to enhance degree of freedom in tuning of the vibration-damping characteristics. It is also possible to enhance or add function by constructing a stopper mechanism against a particular vibration input direction utilizing the inside projection. Moreover, it is also possible to try to enhance performance of the tubular vibration-damping device such as load bearing characteristics by reinforcing the outer tube member in a particular large load input direction.

In addition, in the press-fitting surface of the outer tube member into the tubular bracket, the gap is provided in the portion corresponding to the inside projection. Therefore, the problem of damage of the tubular bracket caused by formation of the inside projection is effectively eliminated with a simple structure preventing any especial reinforcing member. Particularly, the gap is partly provided in the portion corresponding to the inside projection, so that local concentration of distortion and stress induced on the tubular bracket caused by formation of the inside projection is effectively eliminated. Therefore, as to the portion wherein the inside projection is not formed on the outer tube member, the press-fitting fixing force of the outer tube member made of synthetic resin into the tubular bracket is exhibited effectively and stably.

Therefore, according to the present invention, merits such as enhancement of degree of freedom of design due to the inside projection integrally formed by utilizing the feature of the outer tube member made of synthetic resin are sufficiently ensured. In addition, the press-fitting fixing force of the outer tube member made of synthetic resin into the tubular bracket is ensured sufficiently and stably.

A second mode of the present invention provides the tubular vibration-damping device according to the first mode, wherein at an axial end of the outer tube member, the inside projection is integrally formed while an outside projection is integrally formed so as to project to the outer peripheral side.

According to the tubular vibration-damping device of the present mode, not only the above-mentioned inside projection, but also the outside projection is formed integrally to the outer tube member made of synthetic resin. Thus, the outside projection can be utilized for a stopper mechanism in the axial direction and a regulating mechanism of the press-fit end of the tubular bracket for example, and can cooperate with the inside projection so as to enhance load bearing capability of the outer tube member, thereby further enhancing the degree of freedom of design. Especially, although the outside projection as well as the inside projection is formed at the axial end of the outer tube member so that the tubular bracket press-fitted into the portion tends to be damaged, the gap according to the present invention is able to ensure sufficient press-fitting fixing force while avoiding the damage of the tubular bracket.

A third mode of the present invention provides the tubular vibration-damping device according to the first or second mode, wherein the inside projection is formed continuously about an entire circumference of the outer tube member in a circumferential direction.

According to the tubular vibration-damping device of the present mode, owing to the inside projection formed continuously about the entire circumference, the stopper mechanism in the axial direction and an adjusting mechanism of spring ratio for example are realized even more easily and efficiently. In addition, although the inside projection is formed continuously about the entire circumference so that local concentration of stress and the like in the tubular bracket caused by local increase of rigidity and the like tend to occur intensively, the gap in the corresponding press-fitting portion according to the present invention is able to ensure sufficient press-fitting fixing force of the outer tube member and to avoid the damage of the tubular bracket compatibly and stably.

A fourth mode of the present invention provides the tubular vibration-damping device according to any one of the first through third modes, wherein an escape part is provided on the inner peripheral surface of the tubular bracket so as to be remote from the outer peripheral surface of the outer tube member to the outer peripheral side and form the gap.

According to the tubular vibration-damping device of the present mode, owing to the escape part on the inner peripheral surface of the tubular bracket, when the gap is provided in the press-fitting surface, it is not necessary to form a large recess part and the like on the outer peripheral surface of the outer tube member made of synthetic resin. Therefore, it is possible to provide the gap on the press-fitting surface without much decrease of member strength, durability and the like of the outer tube member made of synthetic resin.

A fifth mode of the present invention provides the tubular vibration-damping device according to any one of the first through fourth modes, wherein a thick part, which is made thick radially outwardly, is provided to the tubular bracket at a portion located radially outward of the inside projection of the outer tube member.

According to the tubular vibration-damping device of the present mode, since the tubular bracket has the thick part located radially outward of the inside projection of the outer tube member, the damage of press-fitting portion of the tubular bracket caused by the inside projection of the outer tube member is avoided even more effectively. Furthermore, the thick part functions to reinforce the tubular bracket, it is also possible to set the smaller gap provided on the press-fitting surface of the outer tube member while avoiding the damage of the tubular bracket.

A sixth mode of the present invention provides the tubular vibration-damping device according to any one of the first through fifth modes, wherein the tubular bracket is made of either one of an aluminum alloy and a fiber-reinforced resin.

According to the tubular vibration-damping device of the present mode, there is a premise that the damage of the tubular bracket into which the outer tube member is press-fitted is avoided owing to the gap provided on the press-fitting surface so that the rigidity, durability and the like required to the tubular bracket are moderated. Therefore, the whole tubular vibration-damping device having a bracket can achieve even lighter weight by adopting aluminum alloy except for iron metal and fiber-reinforced resin.

According to the tubular vibration-damping device having a bracket of the present invention, since the inside projection is formed integrally to the outer tube member made of synthetic resin, the vibration-damping characteristics can be tuned easily. In addition, in the case where the tubular bracket is made of aluminum alloy or the like, the gap provided between the outer tube member and the tubular bracket can prevent the damage of the tubular bracket.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Embodiments of the present invention will be described below in reference to the drawings.

First, FIGS. 1 to 4 show an automotive member mount 10 as a first embodiment of the tubular vibration-damping device having a bracket according to the present invention. The member mount 10 is configured to be installed on a mounting part of a member of suspension on the side of a vehicle body and elastically connects the suspension member and the vehicle. Besides, in the description hereafter, the axial direction means the vertical direction in FIG. 3, that is, a center axial direction of the member mount 10. Also the upper and the lower direction mean the upper and lower direction respectively in FIG. 3.

More specifically, the member mount 10 is entirely tube shape and is comprised of a tubular vibration-damping device 12 press-fitted and attached into a tubular bracket 14. The tubular vibration-damping device 12 includes an inner shaft member 16, an outer tube member 18 and a main rubber elastic body 20 elastically connecting the inner shaft member 16 and the outer tube member 18.

Figure 1:
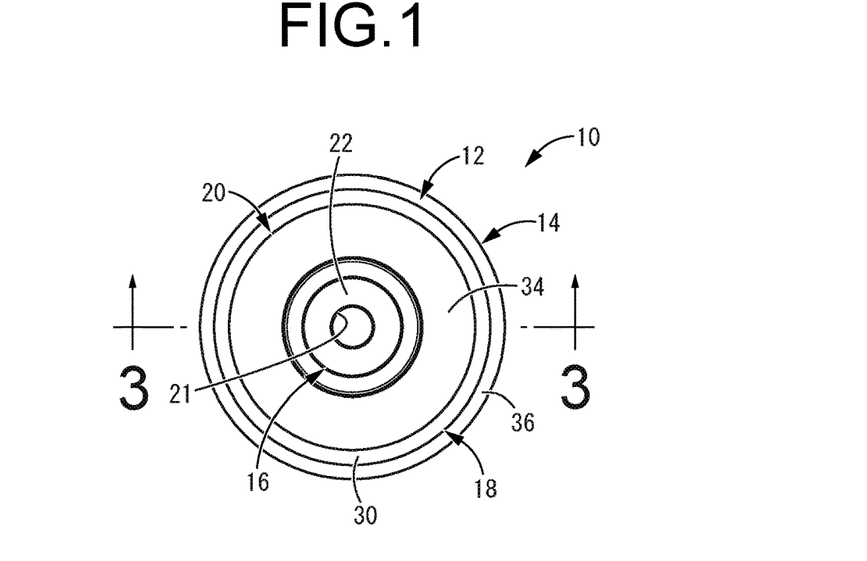
FIG. 1 is a plan view of a tubular vibration-damping device having a bracket as a first embodiment of the present invention.
Figure 2:
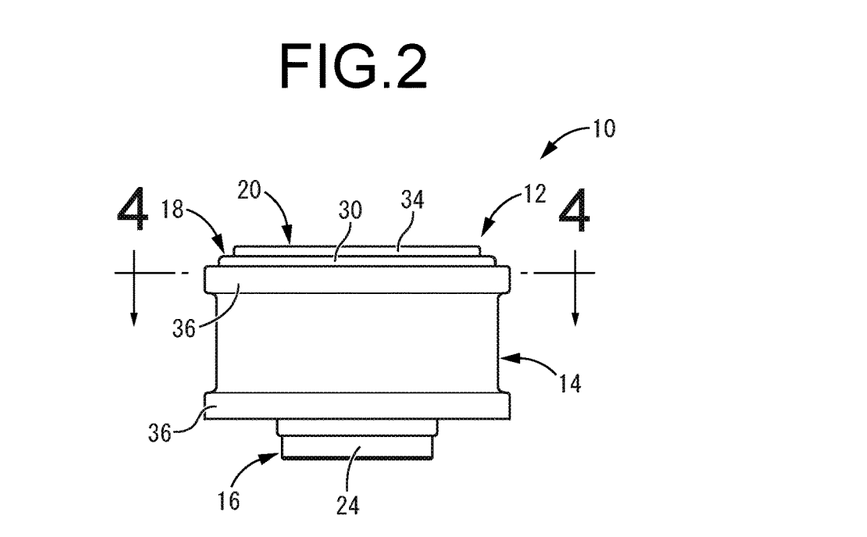
FIG. 2 is a front view of the tubular vibration-damping device shown in FIG. 1.
Figure 3:
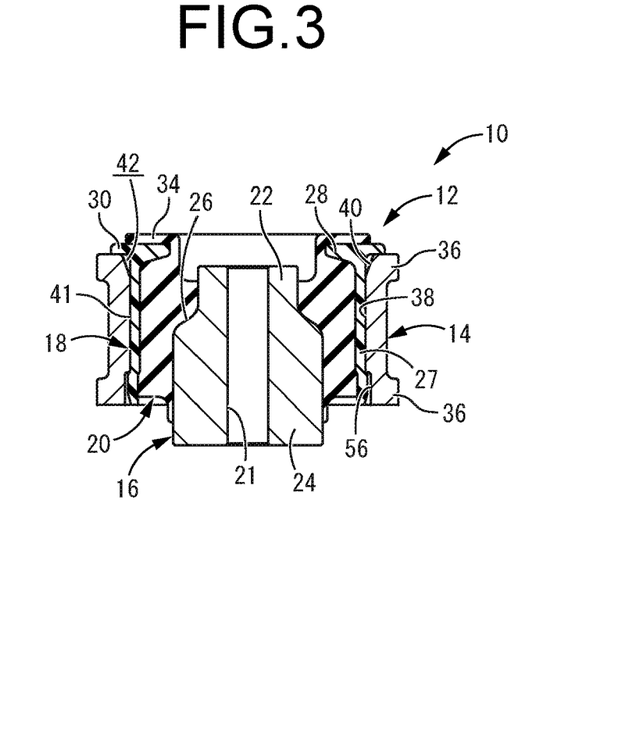
FIG. 3 is a cross-section view taken along line 3-3 of FIG. 1.
Figure 4:
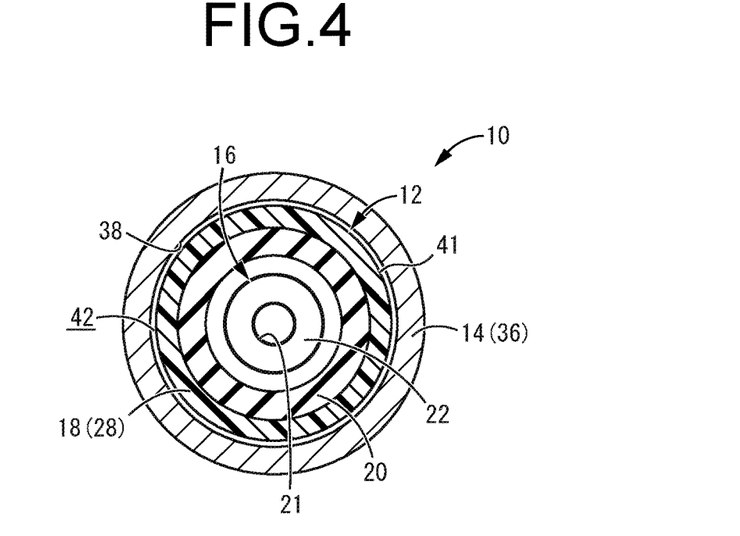
FIG. 4 is a cross-section view taken along line 4-4 of FIG. 2.

The inner shaft member 16 is entirely a roughly small-diameter circular tube shape and is made of metal such as iron and aluminum alloy or fiber-reinforced synthetic resin. A circular central hole 21 extends roughly straight in the axial direction of the inner shaft member 16. The outer peripheral surface of the inner shaft member 16 has a larger diameter on the lower portion than the upper portion, so that the upper portion is a small-diameter tubular portion 22 whereas the lower portion is a large-diameter tubular portion 24. On the outer peripheral surface of the axially medial portion of the inner shaft member 16, a stepped tapered surface 26 is provided with the diameter decreasing as it goes toward the upper portion and connects the small-diameter tubular portion 22 and large-diameter tubular portion 24 smoothly.

The outer tube member 18 is entirely a roughly large-diameter circular tube shape with a peripheral wall part 27 as a tubular portion. The outer tube member 18 is made of synthetic resin. As to the synthetic resin, polyamide, polyacetal, polybutylene terephthalate or polycarbonate for example is adopted. More preferably adopted is fiber-reinforced synthetic resin reinforced with glass fiber or carbon fiber (GFRP or CFRP) or the like.

An inside projection 28 projecting radially inwardly is formed integrally to the outer tube member 18 at the upper opening end of the tubular portion (the peripheral wall part 27). The inside projection 28 is annularly formed continuously about the entire circumference of the outer tube member 18 in the circumferential direction, with the upper end face being a flat surface extending in the roughly axis-perpendicular direction and the lower end face being a sloped surface sloping down as it goes radially outwardly. Namely, the inside projection 28 gradually gets thin as it goes from the radially outer side to the radially inner side, that is, from the projecting proximal end to the projecting distal end.

Also, an outside projection 30 projecting radially outwardly is formed integrally to the outer tube member 18 at the upper opening end of the tubular portion (the peripheral wall part 27). The outside projection 30 is annularly formed continuously about an entire circumference of the outer tube member 18 in the circumferential direction, with each of the upper and lower end faces being a flat surface extending in the roughly axis-perpendicular direction. The inside projection 28 and the outside projection 30 are located roughly on the same plane on the each upper end face. Meanwhile, the maximum axial dimension of the inside projection 28 is larger than the axial dimension of the outside projection 30, that is, the projecting proximal end of the inside projection 28 is lower than the projecting proximal end of the outside projection 30.

The inner shaft member 16 is disposed in a state roughly coaxially inserted into the outer tube member 18 with a prescribed radial distance continuously about the entire circumference. The inner shaft member 16 and the outer tube member 18 are elastically connected by the main rubber elastic body 20 arranged between radially opposed faces. The main rubber elastic body 20 is entirely roughly circular tube shaped rubber elastic body whose inner peripheral surface is bonded to the outer peripheral surface of the inner shaft member 16 by vulcanization and whose outer peripheral surface is bonded to the inner peripheral surface of the outer tube member 18 including the inside projection 28 by vulcanization. The main rubber elastic body 20 is an integrally vulcanization molded component incorporating the inner shaft member 16 and the outer tube member 18. In the present embodiment, in a state wherein the inner shaft member 16 and the outer tube member 18 are elastically connected, the upper end face of the inner shaft member 16 is located below the upper end face (i.e., the first axial end) of the outer tube member 18, and the lower end face of the inner shaft member 16 is located below the lower end face (i.e., the second axial end) of the outer tube member 18. Accordingly, the tapered surface 26 of the inner shaft member 16 and the lower end face of the inside projection 28 of the outer tube member 18 are situated in opposition to each other in the inclined axial direction in FIG. 3 via the main rubber elastic body 20.

Furthermore, a cushion rubber 34 is adhered to the upper end face of the outer tube member 18. The cushion rubber 34 has an annular shape extending in the roughly axis-perpendicular direction and is adhered to the outer tube member 18 in a state overlapping the axial end face thereof while extending from the upper end face of the inside projection 28 to the upper end face of the outside projection 30. Besides, the cushion rubber 34 continues to the main rubber elastic body 20 on the radially inside of the inside projection 28, that is, integrally formed to the main rubber elastic body 20.

By so doing, the tubular vibration-damping device 12 is composed of the inner shaft member 16, an outer tube member 18 and a main rubber elastic body 20 elastically connecting the inner shaft member 16 and the outer tube member 18. Furthermore, the member mount 10 is composed of the tubular vibration-damping device 12 press-fitted and attached into the tubular bracket 14.

The tubular bracket 14 is made of metal or synthetic resin. As to metal, iron metal may be adopted for example, however, preferably adopted is light metal such as aluminum alloy and magnesium alloy. As to synthetic resin, fiber-reinforced synthetic resin reinforced with short fiber or long fiber such as resin fiber and carbon fiber is preferably adopted for example, and more preferably adopted is fiber-reinforced synthetic resin such as GFRP and CFRP. Especially, by adopting aluminum alloy, magnesium alloy or fiber-reinforced synthetic resin, reduction of the weight of the tubular bracket 14 and hence the member mount 10 and the like are realized.

The tubular bracket 14 has an entirely circular tube shape extending in the axial direction. In the present embodiment, the tubular bracket 14 is thicker than the peripheral wall part 27 of the outer tube member 18, however, thinner than the radial wall thickness of the portion where the inside projection 28 is formed of the outer tube member 18. Besides, the tubular bracket 14 of the present embodiment has thick parts 36, 36 which are thick radially outwardly on axially both ends.

An inner peripheral surface 38 of the tubular bracket 14 extends roughly straight in the axial direction. An escape part 40 sloping outwardly as it goes upward is provided on the inner peripheral surface of the portion forming the thick part 36 at the upper opening end edge of the tubular bracket 14.

The tubular bracket 14 can be provided integrally to an automotive member of suspension by being fixed by welding or the like. The tubular vibration-damping device 12 is press-fitted and attached into the tubular bracket 14 from the upper opening side. A not-shown bolt is inserted into the central hole 21 of the inner shaft member 16 and fastened thereto by a nut, so that the inner shaft member 16 is fixed to a member of the vehicle body side such as a sub frame. Accordingly the member mount 10 is installed between the suspension member and the vehicle body in an elastic connected manner, so as to reduce vibration from the suspension member to the vehicle side.

When the tubular vibration-damping device 12 is press-fitted into the tubular bracket 14, by the upper end face of the tubular bracket 14 (the upper end face of the upper thick part 36) contacting the lower end face of the outside projection 30 of the outer tube member 18, the press-fitting end of the tubular vibration-damping device 12 into the tubular bracket 14 is determined. The upper end face of the tubular bracket 14 and the lower end face of the outside projection 30 of the outer tube member 18 are both flat surfaces extending in the axis-perpendicular direction and contact each other in an overlapped state.

In addition, an outer peripheral surface 41 of the outer tube member 18 is a circular tube surface with a roughly unchanging outside diameter dimension in the axial direction whereas the inner peripheral surface 38 of the tubular bracket 14 is a circular tube surface with a roughly unchanging inside diameter dimension in the axial direction. On the press-fitting surface of the outer peripheral surface 41 into the inner peripheral surface 38, a gap 42 is provided due to the escape part 40 which is provided near to the upper opening part of the tubular bracket 14 and to be remote from the outer peripheral surface 41 of the outer tube member 18. The gap 42 is located on outer peripheral side of the proximal end of the inside projection 28 of the outer tube member 18 and extends along the entire axial length of the proximal end of the inside projection 28. In the present invention, the escape part 40 extends up to the axial lower side further than the proximal end of the inside projection 28, so that the gap 42 is formed with a space axially larger than the proximal end of the inside projection 28.

Furthermore, the gap 42 extends annularly with a roughly unchanging cross sectional shape about the entire circumference and is provided on the outer peripheral surface of the outer tube member 18 so as to enclose the entire circumference of the proximal end of the inside projection 28. In the present embodiment, the escape part 40 is provided with a chamfered structure with respect to the inner peripheral corner at the axially upper end of the tubular bracket 14, so that the gap 42 has a radially inside dimension getting large as it goes to axially upward. On the axially upper end of the tubular bracket 14, while the escape part 40 enlarges the inner diameter, the thick part 36 ensures radially outward wall thickness instead.

According to the member mount 10 with the above-mentioned structures, since the outer tube member 18 is made of synthetic resin, the outer tube member 18 easily forms the inside projection 28 integrally and easily sets or changes the figure, size, location and the like of the inside projection 28 appropriately. Therefore, the tubular vibration-damping device 12 easily sets or changes the effective free length and volume of the main rubber elastic body 20 appropriately, thereby enhancing degree of freedom in tuning vibration-damping characteristics (such as spring characteristics and spring ratio) in the axial and axis-perpendicular directions. Namely, it is also possible to increase upward deformation rigidity of the main rubber elastic body 20, to increase dynamic and static spring and to suppress upward distortion (amount of elastic deformation) of the main rubber elastic body 20 when large load is input so as to enhance load bearing capability.

When a large load in the axial direction is input, a member on the vehicle body side and the inside projection 28 contact each other via the cushion rubber 34, so that relative displacement of the member mount 10 and the member on the vehicle body side in the axial direction is limited in cushioned fashion. Namely, in the case where the inside projection 28 projecting radially inwardly is formed at the upper end of the outer tube member 18, the inside projection 28 partly constitutes a stopper mechanism for limiting the relative displacement of the member mount 10 and the member on the vehicle body side, thereby ensuring the load bearing capability of the stopper mechanism.

Here, at the press-fitting portion of the outer tube member 18 into the tubular bracket 14, the gap 42 prevents concentration of distortion and stress on the tubular bracket 14 due to formation of the inside projection 28. Consequently, when the tubular bracket 14 is press-fitted into the portion where the inside projection 28 is formed at the outer tube member 18, the tubular bracket 14 can avoid being damaged. Meanwhile, in the portion where the inside projection 28 is not formed, the press-fitting fixing force of the tubular bracket 14 into the outer tube member 18 can be effectively ensured.

Especially, in the present embodiment, since the gap 42 is constituted by the escape part 40 provided on the inner peripheral surface 38 of the tubular bracket 14, it is not necessary to provide a recess and the like on the outer peripheral surface 41 of the outer tube member 18 and the like, thereby ensuring member strength of the outer tube member 18 sufficiently. Also in the tubular bracket 14, the thick part 36 is provided all along the portion where the gap 42 (the escape part 40) is provided so as to ensure member thickness, thereby preventing the damage of the tubular bracket 14 even more advantageously.

Furthermore, the member mount 10 according to the present embodiment has the integrally formed outside projection 30 at the upper end of the outer tube member 18, so that the press-fitting end of the tubular bracket 14 is determined easily and the upper end of the outer tube member 18 is further reinforced, thereby ensuring the contact area of the stopper mechanism and enhancing load bearing capability, or the like.

Figure 5:
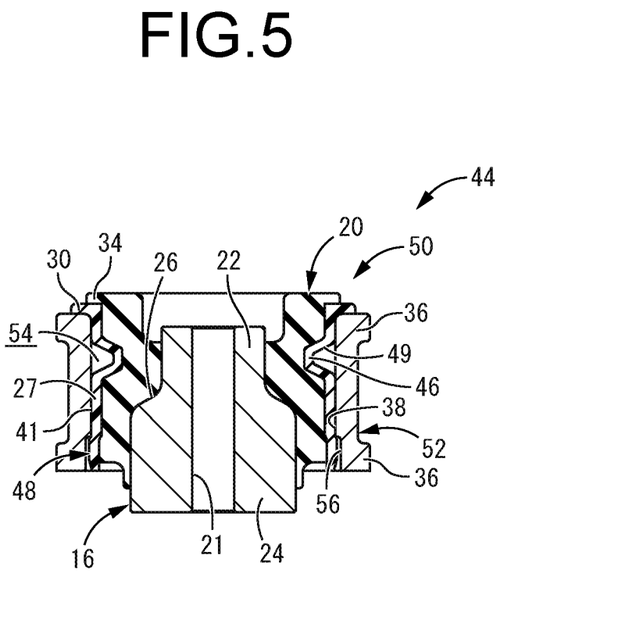
FIG. 5 is a longitudinal cross sectional view of a tubular vibration-damping device having a bracket as a second embodiment of the present invention.

Next, FIG. 5 shows an automotive member mount 44 as a second embodiment of the tubular vibration-damping device having a bracket according to the present invention. While in the preceding first embodiment, the inside projection 28 is formed at the upper end of the outer tube member 18, in the present embodiment, an inside projection 46 is formed in the axial medial portion of an outer tube member 48. Besides, in the description hereafter, components and parts that are substantially identical with those in the preceding first embodiment will be assigned the symbols identical with those in the figure and not described in any detail.

Namely, the outer tube member 48 according to the present embodiment has the stepped circular tube shaped peripheral wall part 27 with a small-diameter section in the axial medial portion. The small-diameter section of the peripheral wall part 27 is formed as the inside projection 46 which has small inner and outer dimension and projects radially inwardly of the outer tube member 48. Namely, while the inside projection 46 projects radially inwardly of the outer tube member 48, the outer peripheral surface 41 of the outer tube member 48 has a recess 49 opening radially outwardly due to the inside projection 46.

In the present embodiment, the inside projection 46 has roughly unchanging cross sectional shape about the entire circumference of the peripheral wall part 27 and is constituted by the annular ring shaped inside projection 46 and an annular groove shaped recess 49. The inside projection 46 is disposed on the outer peripheral side of the small-diameter tubular portion 22 of the inner shaft member 16 so as to be situated in opposition to the stepped tapered surface 26 in the inclined axial direction with a distance.

A tubular vibration-damping device 50 of the present embodiment comprises the outer tube member 48 and the inner shaft member 16 that are elastically connected by the main rubber elastic body 20 interposed between their opposed faces. The member mount 44 of the present embodiment comprises the tubular vibration-damping device 50 press-fitted into a tubular bracket 52. Although the fundamental structure of the tubular bracket 52 is identical with the tubular bracket 14 of the preceding first embodiment, the tubular bracket 52 of the present embodiment does not have the escape part 40 disclosed in the first embodiment but adopts the tubular bracket 52 with the roughly unchanging inside diameter in the inner peripheral surface 38 which is the press-fitting surface into the outer tube member 48.

According to the structure, in the member mount 44 of the present embodiment, in the press-fitting surface of the outer tube member 48 into the tubular bracket 52, the outer peripheral surface 41 of the outer tube member 48 is remote from the inner peripheral surface 38 of the tubular bracket 52 in the portion where the recess 49 is provided, whereby providing a gap 54. In the present embodiment, since the axial length of the recess 49 on the outer peripheral surface 41 of the outer tube member 48 is smaller than that of the inside projection 46 on the inner peripheral surface of the outer tube member 48, the gap 54 is partly provided where the inside projection 46 is formed. In the present embodiment, both of the inside projection 46 and the gap 54 are provided continuously with a roughly unchanging cross sectional shape about the entire circumference in a circumferential direction as the preceding first embodiment.

According to the member mount 44 of the present embodiment with the above-mentioned structures, the outer tube member 48 is also made of synthetic resin and has the inside projection 46, so that it is technically exhibited that degree of freedom of design of the vibration-damping characteristics and the stopper mechanism is enhanced as the preceding first embodiment. In addition, the gap 54 prevents local concentration of distortion and stress on the tubular bracket 52 due to formation of the inside projection 46, so that it is compatibly accomplished that the press-fitting fixing force of the outer tube member 48 and the tubular bracket 52 is ensured and the damage of the tubular bracket 52 is prevented as the preceding first embodiment.

While the present invention has been described in detail in terms of certain preferred embodiments and examples, the present invention shall not be construed as limited to the specific disclosures in the embodiments, and may be embodied with various changes, modifications and improvements which may occur to those skilled in the art.

For example, the inside or outside projection is modifiable with regard to the specific figure, size, location, number and the like appropriately, not being limited to those described in the preceding embodiments. Namely, considering the required vibration-damping characteristics, load bearing capability, durability and the like, a plurality of the inside or outside projections could be formed at several locations in the axial direction with a distance between each other. Besides, the inside and outside projections could be formed in a length less than once about the circumference in the circumferential direction. Alternatively, the inside or outside projections could be divided in plurality parts in the circumferential direction. In addition, the inside and outside projections could incline in the axial direction so as to project. Note that the outside projection is not essential for the present invention.

the figure of the gap between the outer peripheral surface of the outer tube member and the inner peripheral surface of the tubular bracket is not limited by the preceding embodiments. Namely, the gap could be provided by forming the recess (the escape part 40) on the inner peripheral surface 38 of the tubular bracket 14 as the preceding first embodiment. The gap could also be provided by forming the recess 49 on the outer peripheral surface 41 of the outer tube member 48 as the preceding second embodiment. Besides, the gap could also be provided by forming recesses on both of the inner peripheral surface of the tubular bracket and the outer peripheral surface of the outer tube member so that the openings of the two recesses overlap at least partly. The gap of the press-fitting surface of the outer tube member into the tubular bracket is not limited in the location and size as long as the gap overlaps the formation location of the inside projection at least partly. For example, a plurality of gaps could be provided partly on the outer peripheral surface of the outer tube member corresponding to the inside projection.

Furthermore, although, the inner shaft member 16 with a stepped outer peripheral surface is adopted in the preceding embodiments, a straight inner shaft member without a stepped surface could be adopted. Even in the case, it is possible to construct the stopper mechanism in the axial direction by forming the inside projection at one or each axial end of the outer tube member, or it is possible to form the inside projection in the axial medial portion of the outer tube member so as to make the main rubber elastic body radially thick on axially both sides than the axial medial portion, for example. By so doing, the degree of freedom in tuning of the spring characteristics such as lowering spring in the prizing direction with respect to the axis-perpendicular direction can be enhanced, or the like.

In the preceding embodiments, the tubular bracket 14 has a large-diameter portion 56 at the axial end of the inner peripheral surface 38 which is press-fitting surface (the lower end in FIG. 3). A portion of the outer tube member 18 situated in opposition to the large-diameter portion 56 increases its diameter due to elastic recover force so as to enter the large-diameter portion 56 partly. Therefore, reduction of extracting force after suffering stress of heat is prevented, and an action of press-fit load on the axial end of the outer tube member 18 (the lower end in FIG. 3) is avoided. Additionally, member strength is ensured since the thick part 36 which is thick radially outwardly is also provided at the portion where the large-diameter portion 56 is provided. However, the structure is not essential for the present invention.

Besides, the tubular vibration-damping device is not limited to those in the preceding embodiments. All required is that the tubular vibration-damping device comprises an inner shaft member, an outer tube member made of synthetic resin and disposed on the outer peripheral side of the inner shaft member, and a main rubber elastic body connecting the inner shaft member and the outer tube member. For example, a fluid-filled tubular vibration-damping device in which fluid or liquid is sealed could be adopted.

The structure of the tubular bracket is not particularly limited as long as it is tube shape and has a mounting hole into which a tubular vibration-damping device is press-fitted. For example, a tubular bracket could integrally have a bolt-fixing leg part projecting from the outer peripheral surface for the purpose of fixing the tubular bracket with a vehicle body or a sub frame and the like. Moreover, a tubular bracket could be provided integrally to a sub frame or a suspension member.

Furthermore, the tubular vibration-damping device having a bracket in the present invention is not limited to be adopted for the automotive member mount disclosed in the preceding embodiments, but also adoptable for kinds of non-automotive tubular vibration-damping devices as well as for an automotive tubular vibration-damping device such as an engine mount, a body mount and a suspension bushing.

What is claimed is:

1. A damping device comprising
a tubular vibration-damping device press-fitted and attached into a tubular bracket, the tubular vibration-damping device including an inner shaft member, an outer tube member made of synthetic resin and disposed on an outer peripheral side of the inner shaft member, and a main rubber elastic body connecting the inner shaft member and the outer tube member, wherein
an inside projection is integrally formed with the outer tube member so as to project radially inwardly,
a gap is provided between an outer peripheral surface of the outer tube member and an inner peripheral surface of the tubular bracket at a position in a peripheral wall part of the outer tube member where the inside projection is formed,
the inside projection is formed continuously about an entire circumference of the outer tube member in a circumferential direction,
the inner shaft member includes a small-diameter tubular portion located at one axial side thereof, a large-diameter tubular portion located at another axial side thereof, and a tapered surface located at an axially middle portion thereof with a diameter of the tapered surface decreasing from the large-diameter tubular portion toward the small-diameter tubular portion, and
with the inner shaft member and the outer tube member being elastically connected by the main rubber elastic body, an end face of the small-diameter tubular portion is located between a first axial end of the outer tube member and a second axial end of the outer tube member so that the tapered surface of the inner shaft member and a lower end face of the inside projection of the outer tube member are situated in opposition to each other in an inclined axial direction via the main rubber elastic body.

2. The tubular vibration-damping device according to claim 1, wherein at the first axial end of the outer tube member, the inside projection is integrally formed while an outside projection is integrally formed so as to project to the outer peripheral side.

3. The tubular vibration-damping device according to claim 1, wherein an escape part is provided on the inner peripheral surface of the tubular bracket so as to be remote from the outer peripheral surface of the outer tube member to the outer peripheral side and form the gap.

4. The tubular vibration-damping device according to claim 1, wherein a thick part, which is made thick radially outwardly, is provided to the tubular bracket at a portion located radially outward of the inside projection of the outer tube member.

5. The tubular vibration-damping device according to claim 1, wherein the tubular bracket is made of either one of an aluminum alloy and a fiber-reinforced resin.

* * * * *